United States Patent [19]

Lipton

[11] Patent Number: 5,220,662
[45] Date of Patent: Jun. 15, 1993

[54] LOGIC EQUATION FAULT ANALYZER

[75] Inventor: Arnold S. Lipton, Phoenix, Ariz.

[73] Assignee: Bull HN Information Systems Inc., Billerica, Mass.

[21] Appl. No.: 676,673

[22] Filed: Mar. 28, 1991

[51] Int. Cl.$^5$ .............................................. G01R 31/28
[52] U.S. Cl. ...................................... 395/575; 371/26
[58] Field of Search ..................... 395/575; 371/26, 27

[56] References Cited

U.S. PATENT DOCUMENTS

| | | | |
|---|---|---|---|
| 4,725,971 | 2/1988 | Doshi et al. | 371/26 |
| 4,847,795 | 7/1989 | Baker et al. | 371/26 |

OTHER PUBLICATIONS

"The 8086/8088 Family: Design, Programming, & Interfacing", by John Uttenbeck, ©1987, Prentice-Hall, Inc. pp. 521, 522.

Primary Examiner—Vincent P. Canney
Attorney, Agent, or Firm—J. H. Phillips; J. S. Solakian

[57] ABSTRACT

In order to provide the facility in an information processing system to analyze system faults which result in the setting of one or more flags, a logic equation fault analyzer utility program is used. In the exemplary implementation, the fault flags are the symbols, and the combinations of symbols which make up a specific fault event can be expressed in terms of a logic equation. A logic equation is written for each of all known fault events which may occur in a given system, and these logic equations are placed in a table on a prioritized basis. It will then be the responsibility of the logic equation fault analyzer to identify the first equation in the table which matches the input symbols. In addition the logic equation fault analyzer must identify those symbols which are not part of the equation so that these symbols may be analyzed separately at a later time.

3 Claims, 6 Drawing Sheets

LOGIC EQUATION FAULT ANALYZER

FIELD OF THE INVENTION

This invention relates to the art of computers and, more particularly, to a logic equation fault analyzer for performing system fault analysis in a computer system.

BACKGROUND OF THE INVENTION

In many computer systems, a hardware detected fault event results in the setting of a "flag" to record the fact of fault detection in order that the event can be subsequently analyzed and the circumstances causing it can be treated. Depending on the particulars of the sensed fault event, one or more flags may be set. In the simple case of a single flag being set, determination of the underlying fault is straightforward. However, the setting of multiple flags (particularly in a system employing a plurality of modules such as a multiprocessor system) results in a combination of error indications which is more difficult to interpret, and the problem is further complicated by the fact that a second or even third error event may occur simultaneously which is unrelated to the original error event.

To simplify the problem of determining a specific underlying fault event from the occurrence of a group of related and unrelated flags, the subject logic equation fault analyzer may be used. The advantages realized are:

1) All potential fault events can be expressed in a precise mathematical format;
2) Determination of a specific event is simply a matter of perusing a table; and
3) If errors are discovered in the event determination, or new events are discovered, changes are localized to simply updating a table as opposed to going through hundreds of lines of code.

OBJECTS OF THE INVENTION

It is therefore a broad object of this invention to provide an improved means for analyzing detected system fault conditions which are characterized by the setting of a plurality of flags in order to determine the underlying fault.

It is another object of this invention to provide a logic equation fault analyzer for that purpose which is efficient in its use of system resources and is particularly effective in operation.

In another aspect, it is an object of this invention to provide a logic equation fault analyzer which can readily be updated as new fault combinations are discovered.

SUMMARY OF THE INVENTION

Briefly, these and other objects of the invention are achieved by employing a logic equation fault analyzer in which the fault flags are employed as symbols and in which the combinations of symbols which make up a specific fault event are expressed in terms of a logic equation. Thus, a logic equation is written for each of all known fault events which may occur in a given system, and these logic equations are placed in a dedicated table on a prioritized basis. It will then be the responsibility of the logic equation fault analyzer to identify the first equation in the table which matches the input symbols of a given fault condition. In addition the logic equation fault analyzer must identify those symbols which are not part of the equation so that these symbols may be analyzed separately at a later time.

The subject logic equation fault analyzer is, in the exemplary embodiment, resident in a Service Processor (SP) component of a multimodule system. The SP is notified of error events occurring throughout the system and employs the logic equation fault analyzer to identify the underlying fault event which triggered the occurrence of a plurality of fault flags. When the underlying event has been identified, appropriate corrective or other action may be undertaken.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
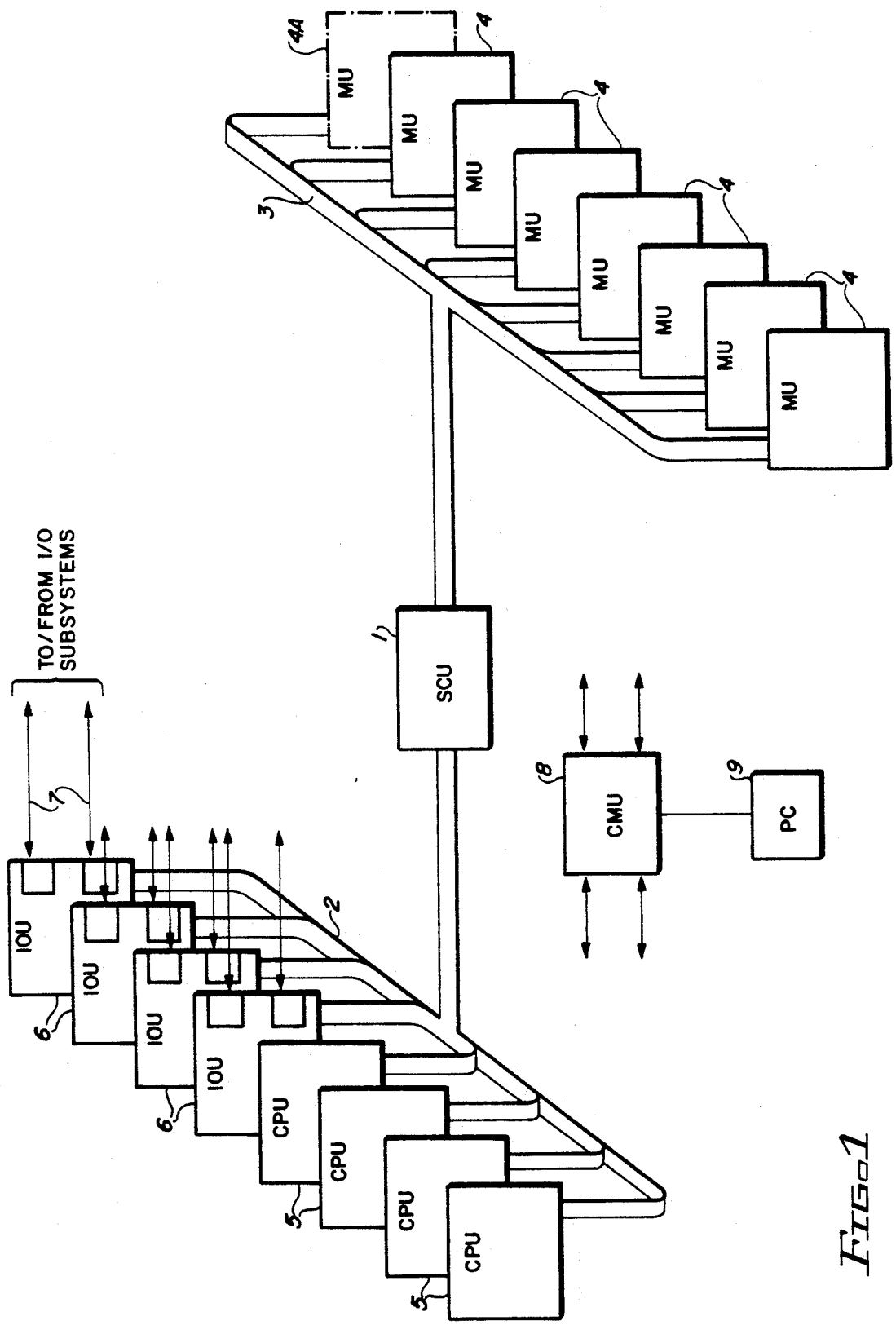
FIG. 1 is a very high level block diagram of the central system structure of an information processing system in which the subject invention finds application.

Attention is first directed to FIG. 1 which illustrates an exemplary Central Subsystem Structure (CSS) within which the subject invention may be incorporated. The System Control Unit (SCU) 1 centralizes and controls the system bus 2 and the memory bus 3 scheduling. The system bus 2 interconnects 1 to 4 CPUs and 1 to 4 Input/Output Units (IOUs) with each other and with the SCU. The memory bus 3 interconnects 1 to 8 MUs with the SCU.

The main memory is composed of up to eight MUs. (A ninth slot, MU 4A, may be provided for ease of reconfiguration and repair in case of failure.) A single bit correction, double bit detection code is stored with every double word; i.e., 8 code bits for every 72 data bits. The code is arranged so that a 4-bit error within a single chip is corrected as four single bit errors in four different words.

The IOUs 6 each provide a connection between the system bus 2 and two Input/Output Busses (IOBs) 7 such that each IOB interfaces with a single IOU. Thus, an IOU manages data transfers between the CSS and the I/O subsystems, not shown in FIG. 1.

A Clock and Maintenance Unit (CMU) 8 generates, distributes and tunes the clock signals for all the units in the CSS, provides the interface between a Service Processor (SP) 9 and the central processing, input/output and power subsystems, initializes the units of the CSS and processes errors detected within the CSS units.

The SP 9 is a personal computer with an integrated modem for facilitating remote maintenance and operations, and large systems may include two SPs through which the system can be dynamically reconfigured for high availability. The SP performs four major functions:

- monitors and controls the CSS during initialization, error logging or diagnostic operations;
- serves as the primary operating system console during system boot or on operator command;
- serves as console and data server for the input/output subsystems Maintenance Channel Adaptor (MCA);
- provides a remote maintenance interface.

Figure 2:
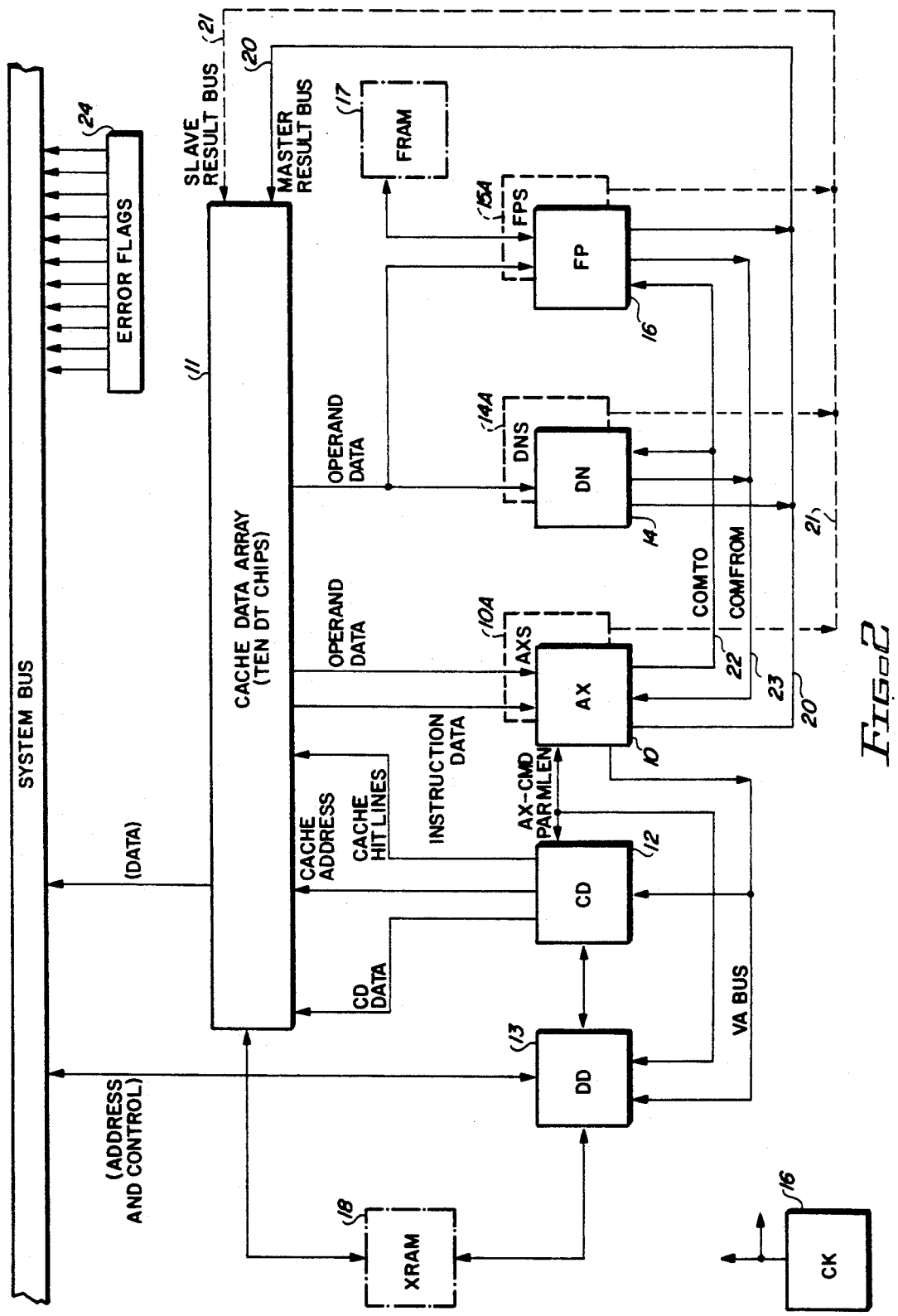
FIG. 2 is a general block diagram of one of the central processing units of the exemplary system shown in FIG. 1.
Figure 3:
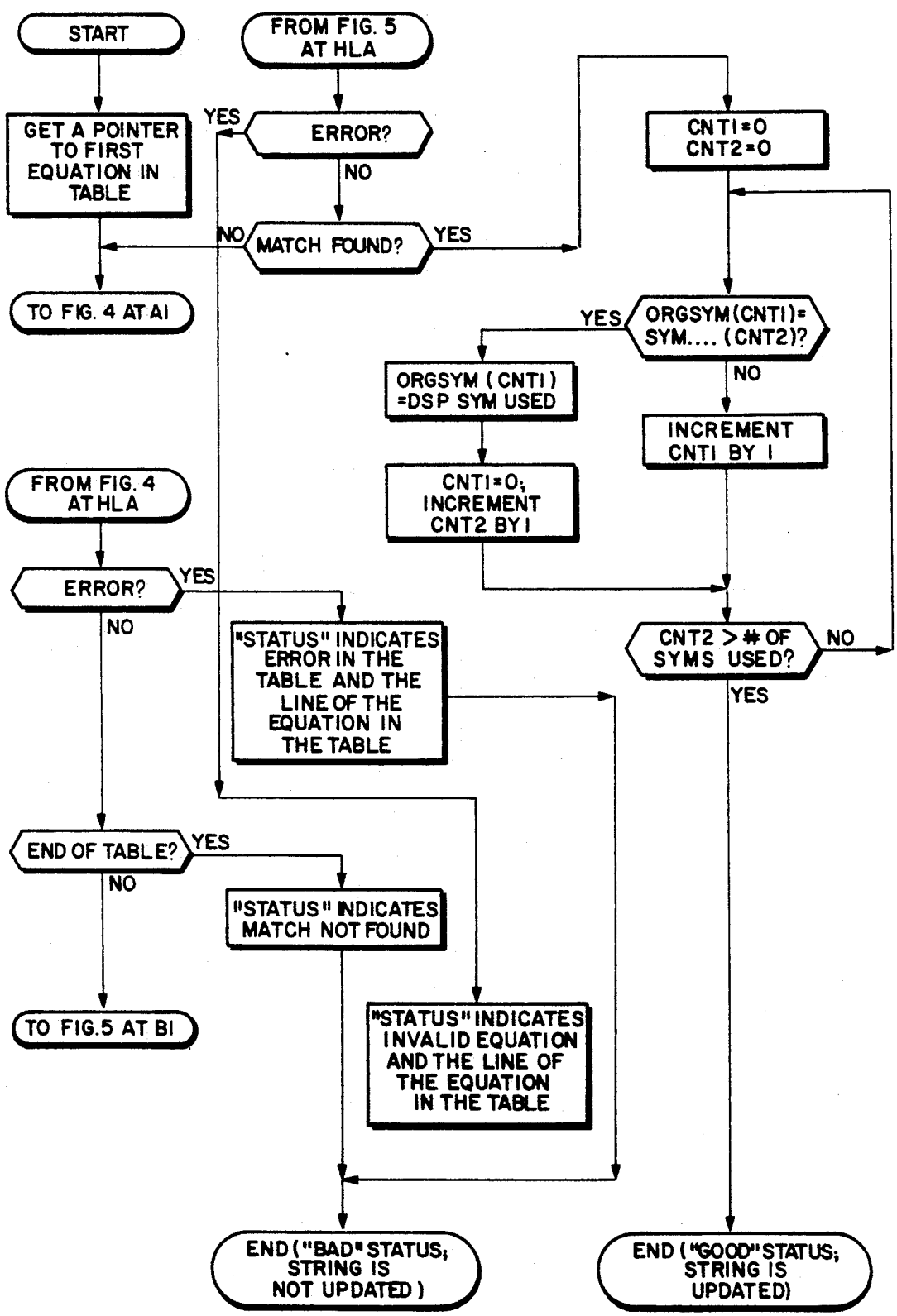
FIG. 3 is a high level and updating section of a flow chart illustrating the invention.
Figure 4:
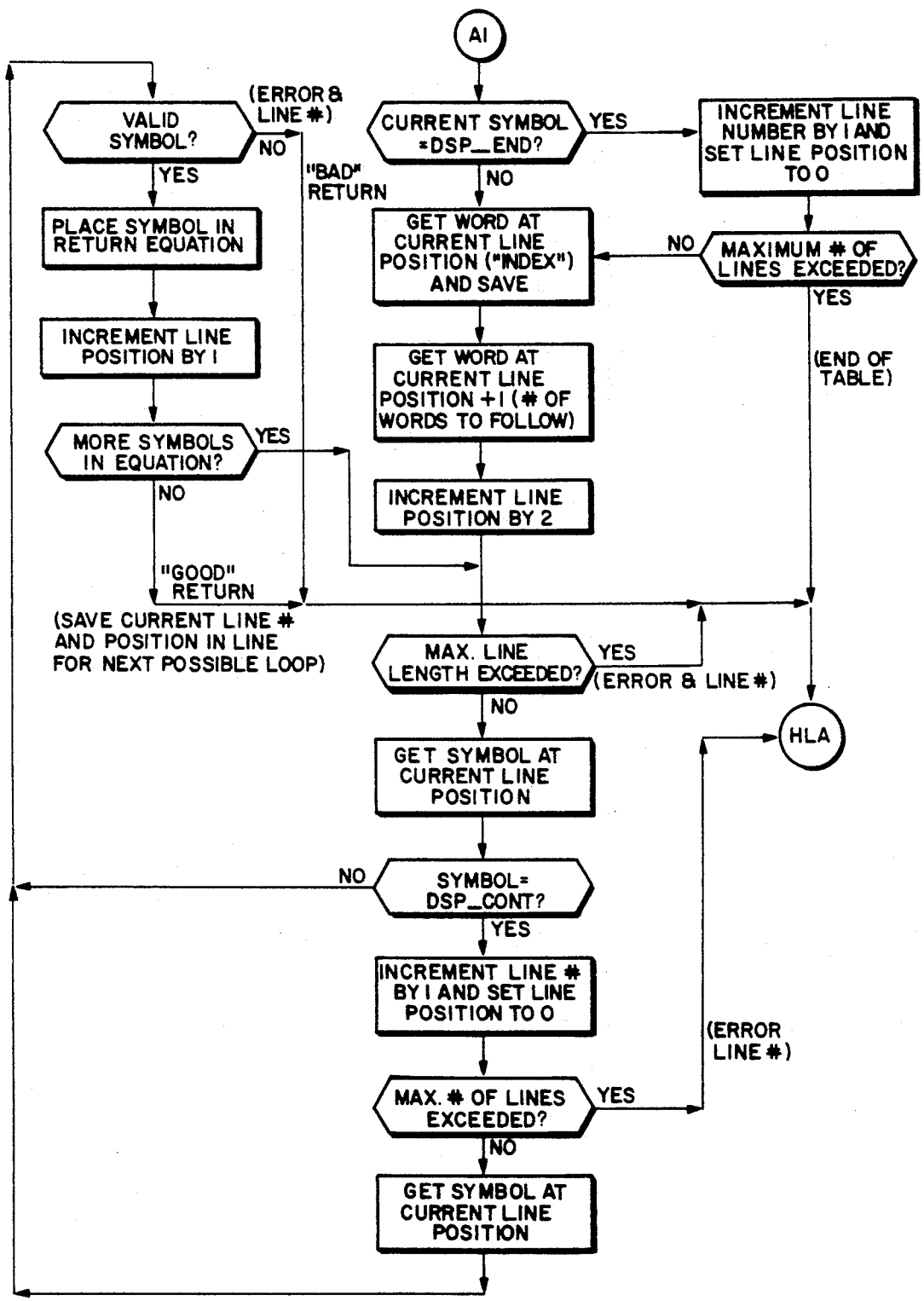
FIG. 4 is a flow chart section pertaining to the extraction of an equation from a logic equation.
Figure 5A:
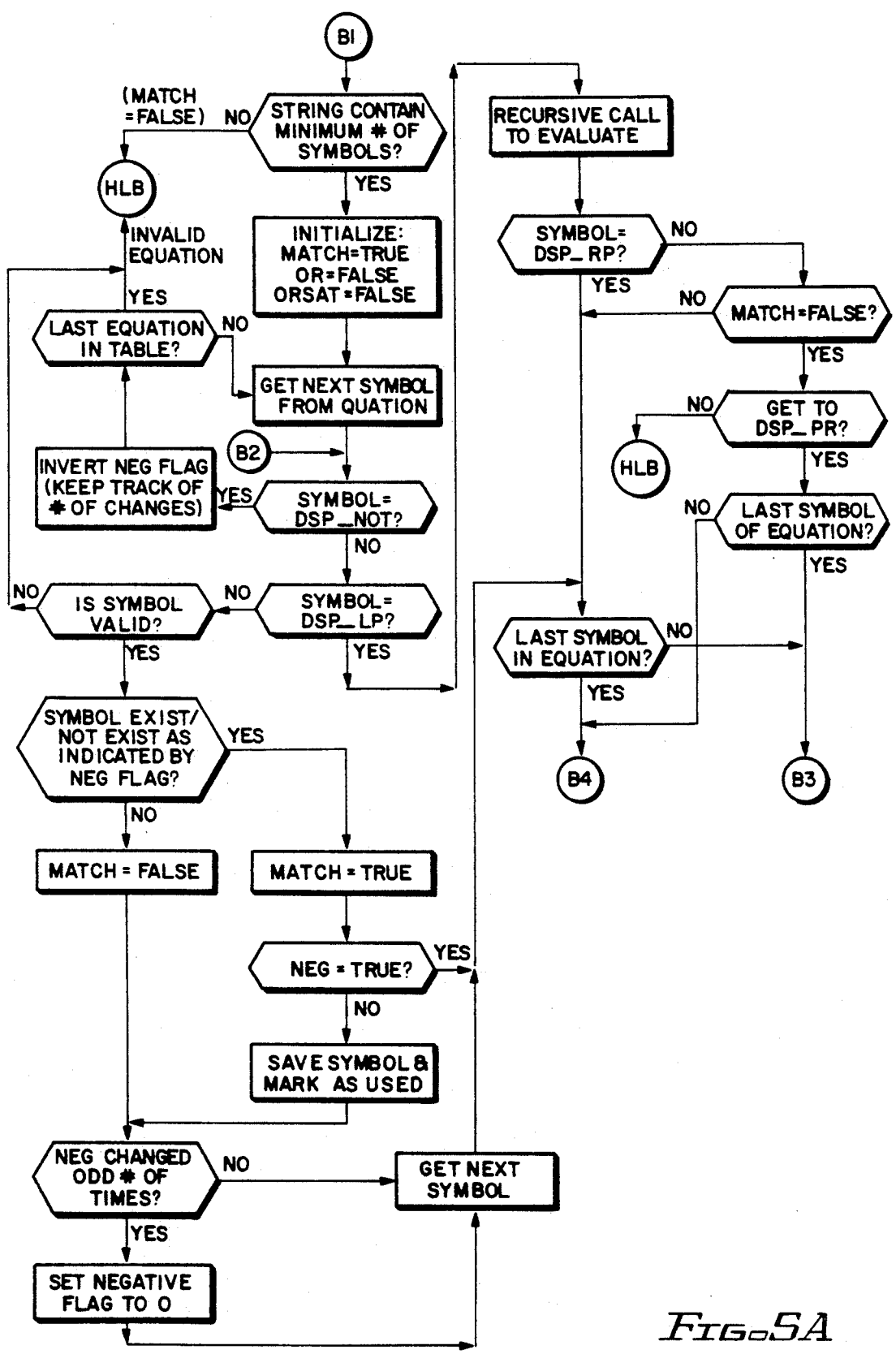
FIG. 5 (FIGS. 5A and 5B, taken together) is a flow chart section in which an extracted equation is recursively evaluated.
Figure 5B:
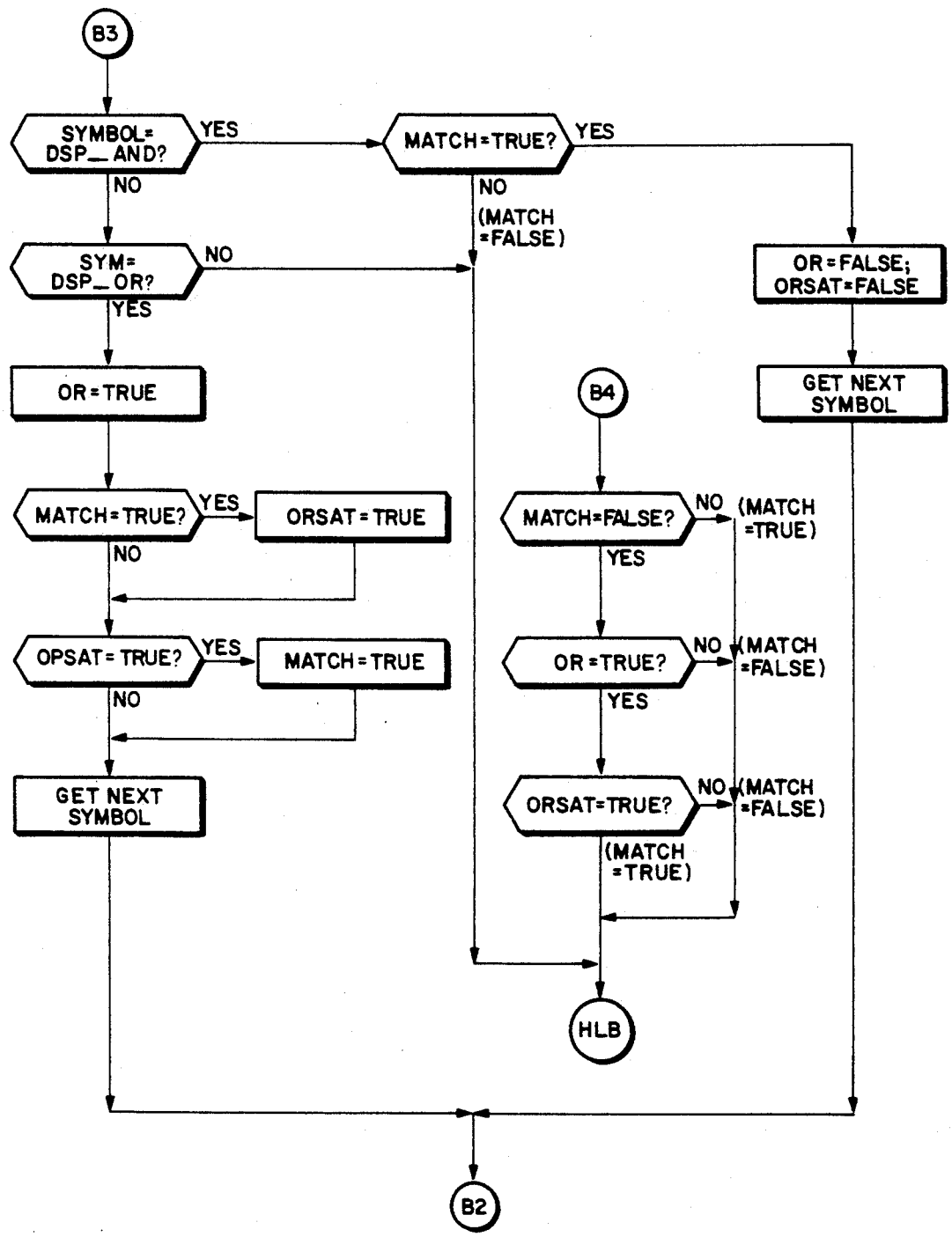

Attention is now directed to FIG. 2 which is a general block diagram of one of the CPUs 5 of FIG. 1. The Address and Execution (AX) Unit is a microprocessing engine which performs all address preparation and executes all instructions except decimal arithmetic, binary floating point and multiply/divide instructions. Two identical AX chips 10, 10A perform duplicate actions in parallel, and the resulting AX chip outputs are constantly compared to detect errors.

The cache unit includes a data part and a set associative directory part which defines the main memory location of each block stored in the cache data part. Physically, the cache unit is implemented in an array of ten DT chips 11, a Cache Directory (CD) chip 12 and a Duplicate Directory (DD) chip 13.

Two copies of the cache directory information are respectively maintained in the CD and DD chips which perform different logic functions. The two directory copies allow interrogation of the cache contents from the system bus in parallel and without interference with instruction/operand access from the CPUs and also provide for error recovery.

Efficient scientific calculation capability is implemented on the Floating Point (FP) chips 15, 15A. The identical FP chips execute all binary floating point arithmetic in duplicate. These chips, operating in concert with the duplicate AX chips 10, 10A, perform scalar or vector scientific processing.

Two special purpose random access memories (FRAM 17 and XRAM 18) are incorporated into the CPU. The FRAM chip 17 is an adjunct to the FP chips 15, 15A and functions as an FP control store and decimal integer table lookup. The XRAM chip 18 is an adjunct to the AX chips 10 10A and serves as a scratchpad as well as providing safestore and patch functions.

The CPU also employs a Clock Distribution (CK) chip 16 whose functions include: clock distribution to the several chips constituting the CPU; shift path control; maintenance; interface between CMU and CPU; and provision of clock stop logic for error detection and recovery.

The DN chip 14 (in parallel with the DN chip 14A) performs the execution of decimal numeric) instructions. It also executes the Decimal-to-Binary (DTB), Binary-to-Decimal (BTD) conversion and Move-Numeric-Edit (MVNE) instructions in conjunction with the AX chip 10. The DN chip receives operands from memory and sends results to memory via the cache unit 11.

The AX, DN and FP chips, collectively, are sometimes referred to as the Basic Processing Unit (BPU). It was previously noted that the AX, DN and FP chips were duplicated with the duplicate units operating in parallel to obtain duplicate results which are available for integrity checking. Thus, master and slave results are obtained in the normal operation of these chips. The master results are placed onto a Master Result Bus (MRB) 20 while the slave results are placed onto a Slave Result Bus (SRB) 21. Both the master and slave results are conveyed, on the MRB and SRB respectively, to the Cache Data Array 11 where they are compared. In addition, a COMTO bus 22 and a COM-FROM bus 23 couple together the AX unit, the DN unit and the FP unit for certain interrelated operations.

In accordance with conventional practice, numerous error detection circuits are provided in the CPU shown in FIG. 2 with each specific error detected resulting in the setting of a "flag" as represented by the Error Flags block 24. Thus, the occurrence of one or more errors detected within the CPU will result in the issue of one or more corresponding signals to the System Bus for alerting the SP 9 (FIG. 1) for analysis and system action. Those skilled in the art will understand that the other system modules shown in FIG. 1 have similar capability to sense and report error conditions to the SP in which the logic equation fault analyzer facility according to the present invention is resident.

It is perhaps useful to define a logic equation for use in the specific context of explaining the invention. A logic equation shall for this purpose be defined as "a set of boolean relationships formulated for a set of symbols". The relational operators used by the exemplary logic equation fault analyzer are: AND, OR, NOT, and PARENTHESIS. The only constraints on the symbols is that none may be an operator. The following are examples of logic equations as employed in practicing the invention:

a AND b OR NOT c (a AND b) OR (a AND c)

Next, consider the function of the logic equation fault analyzer according to the invention. Such a logic equation fault analyzer accepts a string of input symbols and determines if the symbols specified by a logic equation stored in a table can be found within this input string. To take the concept of a logic equation fault analyzer a step further, it may be that a "set" of logic equations is defined. In this situation, it may be desired to find the first equation which an input string can be mapped into such that the logic equations must be examined on a priority basis. Still further, it could be desired that all matching logic equations be identified, or it may be desired to identify only the logic equations which optimize the number of symbols used from the input string. Those skilled in the art will understand that the possible variations are numerous.

Consider now the characteristics of the exemplary logic equation fault analyzer.

SYNTAX

The syntax of a logic equation is as follows: Operators:

+ = AND
^ = OR
− = NOT
( = Left Parenthesis
) = Right Parentheses

Symbol = anything in a logic equation other than an operator An exemplary Expression:

Expression = symbol | −symbol | (expression) | expression + expression | expression ^ expression The logic equations are evaluated from left to right with the following operator precedence specified from highest to lowest:

(1) −

(2) ( )

(3) ∧
(4) +

LOGIC TABLE

The logic table is an ordered table resident in the SP which holds the logic fault equations which have been predetermined from analysis and experience. The format of the logic table is an important part of the logic equation fault analyzer according to the present invention. In choosing the format of the table for a given application, the following considerations should be taken into account:

a) the speed at which matching equations must be found;

b) the number and size of the equations which are defined;

c) the amount of memory available to hold logic equations; and d) the ease with which it is desired to enter and/or modify equations.

For example, logic equations could simply be entered directly into an ASCII text file (one equation per line) if the facility to make frequent changes to the equations is desirable, but speed is not a high priority.

The implementation chosen for example is a format which achieves an optimization of both speed and memory efficiency and which may be customized by the application calling the function. The logic table will therefore be an m by n array fully contained in memory where m is the number of lines in the array and n is the length (in words) of each individual line. The calling application places the equation data in this array and passes the dimensions of the array to the logic equation fault analyzer export function. The format of the data in each line of the array is such that the application has a choice as to how efficiently memory is used. Each symbol and operator in the table is coded to take up one word. The assigned operator codes, in hexadecimal, are as follows:

FFF0 = +
FFF1 = ∧
FFF2 = −
FFF3 = (
FFF4 = )

In addition, the table also uses the following special codes:

FFFA = no more equations on the line; this code word is required at the end of a line if the last equation in the line does not span to the next line and is also required if no equation is currently resident in a line (which is a valid condition).

FFFB = equation is split and continued on the next line.

The assignment of the above designators leaves codes 0000 to FFEF available for symbols.

In addition, each equation is preceded or preambled by two words. The first word is an index which uniquely identifies the equation. The second word is split into a low order byte which indicates the minimum number of symbols needed for a match and a high order byte which specifies the number of words (including both symbols and operators) that make up the equation. This feature allows the relevant algorithm to quickly decide if it is necessary to peruse the line.

This arrangement also achieves the efficient use of memory by allowing multiple equations on a line. For example, if each line is thirty words in length and an equation spans only one word, then the rest of the line is available for use. It should be further noted that all operators and special symbols are defined as constants as more particularly set forth below in the section entitled DEFINITION OF SPLBLEA.H.

Setting up of the logic table is the responsibility of the calling application, and it is possible to set up the table as a structure in memory, or a driver may be written to dynamically build the table from a text file.

The following example shows the corresponding hexadecimal code for two logic equations — (A+B)∧C and A B — which will fit in a single line:

---
00010701FFF3000AFFF0000BFFF4FFF1000C00020301000AFFF1000BFFFA
---

If the above table were set up as a constant in an exemplary program written in the widely used "C" language, it could be defined as a global table as follows:

```
/*---------------------*/
/*Logic Equation Table*/
/*---------------------*/
WORD LogicArray[15];
LogicArray LogicEquationTable[3] = {
/* first equation = (A+B) C */
{0x0001,0x0701,DSP_LP,0x000A,DSP_AND,0x000B,DSP_RP,DSP_OR,0x000C,
* second equation = A  B */
0x0002,0x0301,0x000A,DSP_OR,0x000B,
DSP_END},
* unused lines */
{DSP_END,0,0,0,0,0,0,0,0,0,0,0,0,0,0}
{DSP_END,0,0,0,0,0,0,0,0,0,0,0,0,0,0}}
```

The above example illustrates how a logic table may be built in accordance with the subject logic equation fault analyzer. In this example, the table has room for three lines of fifteen words each; however, only the first line is filled.

Consider now the functions in the exemplary logic equation fault analyzer.

LBLEA_FindFirstMatch

GENERAL DESCRIPTION

This export function accepts a pointer to a string of symbols and a pointer to a logic table and sequentially searches the logic table until the first matching equation is found (or until the table has been exhausted). It will be understood that not all symbols in the input string need necessarily be used to match an equation; however, symbols that are used will be noted so that any symbols that were not used may be noted by the calling application.

CALL

DWORD=LBLEA_FindFirstMatch (lpErrorString, lpEquationTable, wSizeLine, wNumLines)

INPUT PARAMETERS lpInputSymbols—This is a long pointer to a line of words. The first word contains the number of symbols which follow. Each symbol is a word, and these are the symbols which must be matched to a logic equation. Any symbols used (if a match is found) will be set to 0xFFFF. In effect, this is a long pointer to a word which is the first word of the error string and is of type LPWSTR as defined in the section below entitled DEFINITION OF SPLBLEA.H.

lpEquationTable—This is a long pointer to a logic table; in effect, a long pointer to a word which is the first word of the table. This will be of type LPWSTR as defined in the section entitled DEFINITION OF SPLBLEA.H.

wSizeLine—This is a word which indicates the size of a single line in the logic table.

wNumLines—This is a word which indicates the total number of lines in the logic table.

OUTPUT PARAMETERS

DWORD:
LOWORD=Major Status
HIWORD=Minor Status

Major status's and associated minor status: if major status=0, then the minor status=the index associated with the matching equation.

DSP_ENDTABLE—No match was found in the table; there is no corresponding minor status.

DSP_GETEQ—An error was encountered while extracting an equation from the table. For example, a DSP_END was not found before the end of the line. Minor Status=line number in table where error was encountered.

DSP_INVEQ—An error was encountered while parsing an equation. The syntax of the equation was not correct as defined above. Minor Status=line number in table where error was encountered.

DSP_ERROR—This is a catastrophic error related to the operating system. There is no associated minor status. This error usually means that memory space available has been exhausted or that a global handle could not be locked for some reason.

ALGORITHM

While (not End_Of_Table AND not Error AND not Equation_Found)
Get an Equation from the table
Compare the string to the equation for a match
If a match is found
Mark all symbols which are used in the match for the return

| PROCEDURE HIERARCHY: |
|---|
| LBLEA_FindFirstMatch |

| -continued |
|---|
| PROCEDURE HIERARCHY: |
| LBLEA_GetEquation |
| LBLEA_IsMatch |
| LBLEA_Evaluate |
| LBLEA_Evaluate |
| LBLEA_DoesSymExist |
| LBLEA_ProcessOp |
| LBLEA_UpdateErrString |

LBLEA_DoesSymExist

GENERAL DESCRIPTION

This support function checks whether or not a given symbol exists within a string of symbols.

CALL

BOOL=LBLEA_DoesSymExist (npSymsUsed, lpSyms, wSym, bNeg)

INPUT PARAMETERS npSymsUsed—This is a near pointer to a line of words which holds symbols that were found to exist/not exist as specified. The first word indicates the current number of symbols in the array.

lpSyms—This is a long pointer to a line of words. The first word contains the number of symbols which follow; each symbol is a word.

wSym—This is a word containing the symbol being sought.

bNeg—This is a boolean value; if true, a determination is being made as to whether the given symbol exists; else, it must be verified that the symbol does not exist in the string.

OUTPUT PARAMETERS

BOOL—the given symbol was found/not found as specified.

ALGORITHM

If bNeg=FALSE
While ((not found) and (not end of lpSyms))
Check current index
If found
Indicate in npSymsUsed
Return TRUE
Else return FALSE
Else
While ((not found) and (not end of lpSyms)) Check current index
If found
Return FALSE
Else return TRUE LBLEA_Evaluate

GENERAL DESCRIPTION

This is a recursive support function which checks to see if a given set of symbols can be matched to a given logic equation. It will be observed that not all symbols must be used to match an equation.

CALL

BOOL=LBLEA_Evaluate (npSymsUsed, lpSyms, npEq, cbSizeEq, lpOffset, bNeg, lpResults)

INPUT PARAMETERS npSymsUsed—This is a near pointer to a line of words which holds symbols that were found to exist/not exist as specified. The first word indicates the current number of symbols in the line.

lpSyms—This is a long pointer to a line of words. The first word contains the number of symbols which follow; each symbol is a word.

NpEq—A near pointer to a logic equation.

cbSizeEq—A byte specifying the number of words needed to make up the equation.

—lpOffset—A long pointer to a byte indicating a position in the equation being evaluated.

bNeg—A boolean value which indicates whether symbols should exist or should not exist; indicates a NOT condition.

lpResults—A long pointer to a DWORD status. Valid statuses are the same as those defined in section LBLEA_FindFirstMatch (OUTPUT PARAMETERS), except that there will never be a DSP_GetEq status.

OUTPUT PARAMETERS

BOOL—Was there a match.

| ALGORITHM: |
|---|
| While ((not end of equation) and (current eq sym != DSP_RP) and (match = TRUE) and (not an error)) |
|   Process any NOT operators |
|     Set/reset bNeg as for all "—" symbols |
|     Verify a valid symbol or DSP_LP follows |
|   If DSP_LP |
|     Recursive Call to LBLEA_Evaluate |
|     Better be at DSP_RP |
|     If (not at end of equation) |
|       LBLEA_ProcessOp |
|     Reset bNeg to previous state |
|   Else |
|     Match = LBLEA_DoesSymExist |
|     LBLEA_ProcessOp |
|     Reset bNeg to previous state |

Make adjustment for return (if an OR sequence, it has not been satisfied, Match=FALSE)

LBLEA_GetEquation

GENERAL DESCRIPTION

This support function extracts a single logic equation from the logic table starting at the specified position.

CALL

DWORD=LBLEA_GetEquation (lpEqHandle, lpEqTable, lpwLine, lpwPos, wSizeLine, wNumLines)

INPUT PARAMETERS lpEqHandle—This is a long pointer to a handle to a local segment which will contain the extracted logic equation.

lpEqTable—This is a long pointer to a logic table and more particularly a long pointer (of type LPWSTR as defined in the section entitled DEFINITION OF SPLBLEA.H) to a word which is the first word of the table.

lpwLine—This is a long pointer to a word which contains the current line number in the logic equation table.

lpwPos—This is a long pointer to a word which contains the current position in the current line of the logic equation table.

wSizeLine—This is a word which indicates the size of a single line in the logic equation table.

wNumLines—This is a word indicates the total number of lines in the logic equation table.

OUTPUT PARAMETERS

DWORD:
  LOWORD=Major Status
  HIWORD=Minor Status

If major status=0, then minor status=the index associated with the matching equation.

DSP_GETEQ—This indicates an error encountered while extracting an equation from the table. (For example, a DSP_END was not found before the end of the line.) Minor Status=the line number in the logic equation table at which the error was encountered.

DSP_ERROR—This indicates a catastrophic error related to the operating system. There is no associated minor status. This error usually means that memory space available has been exhausted or that a global handle could not be locked for some reason.

| ALGORITHM: |
|---|
| If DSP_End |
|   Advance to next line |
| Verify NOT at end of table |
| Get the first word which should be index |
| Get the second word (contains # of symbols in equation) |
| Create a segment for return equation |
| While (more syms in equation) |
|   Get a sym |
|   If DSP_CONT |
|     Advance to next line |
|     Get a symbol |
|   Place symbol in return equation |

Place symbol in return equation

LBLEA_IsMatch

GENERAL DESCRIPTION

This is a main driver function for calling the recursive function LBLEA_IsMatch which tests a logic equation against a string of symbols.

CALL

BOOL=LBLEA_IsMatch (npSymsUsed, hEq, lpErrString, lpResults)

INPUT PARAMETERS npSymsUsed—This is a near pointer to a line of words which holds symbols that were found to exist/not exist as specified. The first word indicates the current number of symbols in the line.

hEq—This is a handle to a segment which holds a single logic equation.

lpErrString—This is a long pointer to a line of words. The first word contains the number of symbols which follow; each symbol is a word.

lpResults—This is a long pointer to a DWORD status. Valid statuses are the same as those defined in Lblea FindFirst Match (OUTPUT PARAMETERS), except that there will never be a DSP_GetEq status.

OUTPUT PARAMETERS

BOOL—Was there a match.

ALGORITHM

Initialize lpResults to good status Lock in the equation handle
If there are at least the min number of syms for a match
LBLEA_Evaluate LBLEA_ProcessOp

GENERAL DESCRIPTION

This function is responsible for processing "AND" and "OR" operators in a logic equation.

CALL

BOOL = LBLEA_ProcessOp (npEq, lpbOrSeq, lpbOrSat, lpbMatch, cbMaxOffset, cbCurOffset)

INPUT PARAMETERS npEq—This is a near pointer to a symbol in a logic equation.
lpbOrSeq—This is a long pointer to a boolean value which indicates that the last or current operator is an OR.
lpbOrSat—This is a long pointer to a boolean value which indicates last or current operator is an OR and the OR condition has been satisfied.
lpbMatch—This is a boolean value which indicates whether the last symbol was found to match.
cbCurOffset—This indicates the actual number of symbols processed in the logic equation.
cbMaxOffset—This indicates the maximum number of symbols in the logic equation.

OUTPUT PARAMETERS

BOOL—Was an error condition encountered.

| ALGORITHM: |
|---|
| Verify that there are more symbols in the logic equation to process |
| If the current symbol to process is an "AND" |
|   If bMatch = FALSE |
|     If ((bOrSeq = TRUE) && (bOrSat = TRUE)) |
|       bMatch = TRUE |
|     Reset bOrSeq AND bOrSat |
| Else if the current symbol to process is an "OR" |
|   bOrSeq = TRUE |
|   If bMatch = TRUE |
|     bOrSat = TRUE |
|     bMatch = TRUE |
| Else |
|   Error |

LBLEA_UpdateErrString

GENERAL DESCRIPTION

This function sets any symbols in lpErrString which are also found in npSymsUsed to 0xFFFF (DSP_SYMUSED).

CALL

LBLEA_UpdateErrString (lpErrString, npSymsUsed)

INPUT PARAMETERS lpErrString—This is a long pointer to a line of words. The first word contains the number of symbols which follow; each symbol is a word.
npSymsUsed—This is a near pointer to a line of words which holds symbols that were found to exist/not exist as specified. The first word indicates the current number of symbols in the line.

OUTPUT PARAMETERS

None

| ALGORITHM: |
|---|
| For (each sym in lpErrString) |
|   Check if symbol in npSymsUsed |
|   If in npSymsUsed |
|     Mark that symbol in lpErrString to |
|     DSP_SYMUSED |

LibMain

GENERAL DESCRIPTION

This routine is executed once when LBIOS is first loaded into memory. Microsoft Windows TM calls this routine which does such things as initialize the local heap.

CALL int = LibMain (P_hInstance, P_wDataSeg, P_wHeapSize, P_lpszCmdLine)

WEP

GENERAL DESCRIPTION

This is a standard Windows TM routine which must be present in all Windows TM Dynamically Linked Library routines. This routine is called by Windows TM upon termination of a DLL and performs necessary cleanup. Initially this function will do nothing; however it is required.

CALL

WEP (P_bSystemExit)

INPUT

P_cbSystemExit—Integer sent from windows.

RETURN

None

| DEFINITION OF SPLBLEA.H | |
|---|---|
| A file "SPLBLEA.H" contains all necessary constants and definitions needed for LBLEA. SPLBLEA.H is defined as follows: | |
| ERROR Constants | |
| #define DSP_ERROR | 0x0001 |
| #define DSP_ENDTABLE | 0x0002 |
| #define DSP_GETEQ | 0x0003 |
| #define DSP_INVEQ | 0x0004 |
| Misc Constants | |
| #define DSP_SPECIALS | 0xFFF0 |

-continued

| | | |
|---|---|---|
| #define DSP_SYMUSED | 0xFFFF | |
| #define DSP_AND | 0xFFF0 | |
| #define DSP_OR | 0xFFF1 | |
| #define DSP_NOT | 0xFFF2 | |
| #define DSP_LP | 0xFFF3 | |
| #define DSP_RP | 0xFFF4 | |
| #define DSP_END | 0xFFFA | |
| #define DSP_CONT | 0xFFFB | | typedef's
typedef WORD FAR * LPWSTR;
typedef WORD NEAR * NPWSTR;
typedef HANDLE FAR * LPHANDLE;
typedef DWORD FAR * LPDW;

Export Functions
DWORD FAR PASCAL LBLEA_FindFirstMatch
(LPWSTR, LPWSTR, WORD, WORD);

Attention is now directed to the flow chart constituting FIGS. 3, 4, 5A and 5B. This flow chart is an alternative disclosure of the invention which will be particularly useful to programmers in practising the invention to a given environment. In the exemplary system, the program corresponding to the flow chart is resident in the SP as is the logic equation table defining known system fault conditions.

Those skilled in the art will appreciate that LBLEA could readily be extended to incorporate other functions such as:
Find the best matching equation
Find all matching equations
Format equations from a disk file into a table Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A computer system including:
   A) a plurality of system modules, each of said system modules including means for sensing the occurrence of a plurality of module faults and for providing flag indicators reporting and identifying the occurrence of module faults;
   B) a service processor included among said system modules, said service processor being adapted to receive said flag indicators from all said system modules;
   C) a logic fault equation table stored in said service processor, said logic fault equation table containing a plurality of logic fault equations corresponding to a corresponding plurality of known potential system logic faults; said logic fault equation table being characterized in that:
      1) said logic fault equation table is stored as an m by n array in which m is the number of lines and n is the length in words in each individual line;
      2) each said logic fault equation comprises symbols and operators;
      3) each symbol and operator in said logic fault equation table is coded to take up one word;
      4) each line of said logic fault equation table incorporates one of:
         a) a first unique code word at the end of a line indicating that the last equation in the line does not span to the next line or that the line is empty; and
         b) a second unique control word indicating that a logic fault equation is split and continues on the next line; and
      5) each logic fault equation stored in said logic fault equation table is preambled by:
         a) a first information word uniquely identifying said logic fault equation it preambles; and
         b) a second information word, said second information word being split into a low order byte and a high order byte of which:
            i) said low order byte specifies the minimum number of symbols needed for a match with said logic fault equation which said second information word preambles; and
            ii) said high order byte specifies the number of words that make up said logic fault equation said second information word preambles; and
   D) means resident in said service processor for determining if a received group of said flag indicators matches a logic fault equation stored in said logic fault equation table.

2. The computer system of claim 1 in which said means resident in said service processor for determining if a received group of said flag indicators matches a logic fault equation stored in said logic fault equation table constitutes a computer program.

3. A method of identifying the underlying source of a computer system fault which results in the setting of a plurality of fault flag indicators comprising the steps of:
   A) preparing a set of logic fault equations, each logic fault equation describing a known potential system fault;
   B) storing the logic fault equations;
   C) collecting signals representing the fault indicators upon the occurrence of a fault event;
   D) comparing the pattern of the fault indicators of a fault event to the stored logic fault equations; and
   E) identifying each stored logic fault equation which matches the pattern of the fault indicators of the fault event;
   F) in which method:
      1) the logic fault equation table is stored as an m by n array in which m is the number of lines and n is the length in words in each individual line;
      2) each logic fault equation comprises symbols and operators;
      3) each symbol and operator in the logic fault equation table is coded to take up one word;
      4) each line of the logic fault equation table incorporates one of:
         a) a first unique code word at the end of a line indicating that the last equation in the line does not span to the next line or that the line is empty; and
         b) a second unique control word indicating that a logic fault equation is split and continues on the next line; and
      5) each logic fault equation stored in the logic fault equation table is preambled by:
         a) a first information word uniquely identifying the logic fault equation if preambles; and
         b) a second information word, the second information word being split into a low order byte and a high order byte of which:
            i) the low order byte specifies the minimum number of symbols needed for a match with the logic fault equation which the second information word preambles; and
            ii) the high order byte specifies the number of words that make up the logic fault equation the second information word preambles.

* * * * *